(12) United States Patent
Bialaschik et al.

(10) Patent No.: US 12,000,715 B2
(45) Date of Patent: Jun. 4, 2024

(54) DEVICE AND METHOD FOR CONTACTLESSLY DETERMINING A POSITION OF A PEDAL

(71) Applicant: Hella GmbH & Co. KGaA, Lippstadt (DE)

(72) Inventors: Martin Bialaschik, Kamen (DE); Nils Labahn, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 304 days.

(21) Appl. No.: 17/526,761

(22) Filed: Nov. 15, 2021

(65) Prior Publication Data

US 2022/0074765 A1    Mar. 10, 2022

Related U.S. Application Data

(63) Continuation of application No. PCT/EP2020/061131, filed on Apr. 22, 2020.

(30) Foreign Application Priority Data

May 14, 2019   (DE) .................... 10 2019 112 572.3

(51) Int. Cl.
  *G01D 5/14*   (2006.01)
  *G05G 1/38*   (2008.04)
  *B60T 7/04*   (2006.01)

(52) U.S. Cl.
  CPC ............. *G01D 5/145* (2013.01); *G05G 1/38* (2013.01); *B60T 7/042* (2013.01); *B60T 2220/04* (2013.01)

(58) Field of Classification Search
  None
  See application file for complete search history.

(56) References Cited

U.S. PATENT DOCUMENTS

| 5,955,881 A | 9/1999 | White et al. |
| 6,342,829 B1 | 1/2002 | Takagi et al. |

(Continued)

FOREIGN PATENT DOCUMENTS

| DE | 10008345 A1 | 12/2000 | |
| DE | 102004043152 A1 * | 7/2005 | ............. B60T 11/16 |

(Continued)

OTHER PUBLICATIONS

Translation of WO 0238930 A2 (Year: 2002).*

(Continued)

*Primary Examiner* — Jermele M Hollington
(74) *Attorney, Agent, or Firm* — Muncy, Geissler, Olds & Lowe, P.C.

(57) ABSTRACT

A device for contactlessly determining a position of a pedal in a vehicle, having at least a magnet and a sensor, wherein the magnet produces a magnetic field that varies with the position of the pedal and detected by the sensor. The sensor has an output for providing at least one sensor signal. A first and a second position range are defined, wherein each position range includes positions of the magnet with respect to the sensor. The processor generates an output signal from the at least one sensor signal. The output signal takes on values that are unambiguously associated with a position of the magnet relative to the sensor in the first position range, and takes on a constant value that is independent of the position of the magnet relative to the sensor in the second position range.

18 Claims, 3 Drawing Sheets

(56) References Cited

U.S. PATENT DOCUMENTS

| | | | |
|---|---|---|---|
| 6,426,619 B1 * | 7/2002 | Pfaffenberger | G01B 7/003 324/207.2 |
| 6,448,763 B1 * | 9/2002 | Spellman | G01D 5/24476 324/207.21 |
| 6,515,473 B2 * | 2/2003 | Pfaffenberger | G01B 7/003 324/207.2 |
| 6,650,109 B1 | 11/2003 | Reichl et al. | |
| 6,809,512 B2 * | 10/2004 | Pfaffenberger | G01B 7/003 324/207.2 |
| 7,538,543 B2 * | 5/2009 | Nicolosi | G01D 5/147 324/207.2 |
| 9,360,537 B2 * | 6/2016 | Schaaf | G01D 5/145 |
| 9,618,318 B2 | 4/2017 | Schaaf | |
| 9,631,918 B2 * | 4/2017 | Weiberle | B60T 7/042 |
| 11,525,715 B2 * | 12/2022 | Krall | G01D 3/02 |
| 11,617,682 B2 * | 4/2023 | Charles | G06F 3/0334 700/301 |
| 2019/0219421 A1 * | 7/2019 | Hoffmann | G01D 21/00 |

FOREIGN PATENT DOCUMENTS

| | | | | |
|---|---|---|---|---|
| DE | 102005033179 A1 | | 1/2007 | |
| DE | 102012203225 A1 | | 9/2013 | |
| DE | 102019112572 A1 * | | 11/2020 | B60T 7/042 |
| WO | WO-0238930 A2 * | | 5/2002 | F02D 11/106 |

OTHER PUBLICATIONS

Translation of DE 102004043152 A1 (Year: 2005).*
Translation of DE 102019112572 A1 (Year: 2020).*
International Search Report dated Jul. 2, 2020 in corresponding application PCT/EP2020/061131.

* cited by examiner

DEVICE AND METHOD FOR CONTACTLESSLY DETERMINING A POSITION OF A PEDAL

This nonprovisional application is a continuation of International Application No. PCT/EP2020/061131, which was filed on Apr. 22, 2020, and which claims priority to German Patent Application No. 10 2019 112 572.3, which was filed in Germany on May 14, 2019, and which are both herein incorporated by reference.

BACKGROUND OF THE INVENTION

Field of the Invention

The present invention relates a device and a method for contactlessly determining a position of a pedal, in particular in a vehicle, having at least a magnet and a sensor.

Description of the Background Art

Modern vehicles transmit the position signal of a pedal, for example of a brake pedal, through hydraulic lines to the brake cylinders. Systems are likewise known in which the position of the pedal is detected contactlessly and passed on to the brake system.

Contactless detection of the position can be accomplished through a position-indicating magnet and a position-determining sensor, for example a Hall sensor. In these cases, the magnet is arranged such that a motion of the pedal is converted into a motion of the magnet. The magnetic field produced by the magnet is detected by the sensor and processed.

The magnetic field is distinguished by a periodicity. As a result, unambiguous position determination is possible in only a limited range, and the maximum detectable positions of the magnet are limited.

A design of the magnet is required with which all positions can be detected continuously. This requires large magnets, resulting in increased costs.

Stringent requirements are placed on the functional safety of a vehicle brake system. For this reason, the determination of the position of a pedal for the purpose of braking demand must be extremely precise and reliable.

In order to ensure the functional safety requirements, position-determining sensors must be qualified and be resistant to interfering fields. If the requirements are not met, the system must be designed to be redundant, leading to increased component and circuit board costs.

SUMMARY OF THE INVENTION

It is therefore an object of the present invention to provide a device of the initially mentioned type such that the lack of unambiguity of the periodic magnetic field is not relevant and, at the same time, the size of the position-indicating magnet can be minimized to save costs.

This object is attained according to the invention by the means that a device for contactlessly determining a position of a pedal, in particular in a vehicle, has at least a magnet and a sensor, wherein the magnet produces a magnetic field that varies with the position of the pedal and that can be detected by means of the sensor, and the sensor has an output for providing at least one sensor signal, wherein the device has a processor, the processor has inputs for reading in the at least one sensor signal and outputs for outputting an output signal, a first and a second position range are defined, wherein each position range includes positions of the magnet with respect to the sensor, the processor generates an output signal from the at least one sensor signal, wherein the output signal takes on values that are unambiguously associated with a position of the magnet relative to the sensor in the first position range, and takes on a constant value that is independent of the position of the magnet relative to the sensor in the second position range.

A position determination for a pedal, in particular in a vehicle, is characterized in that only some of the possible positions of the magnet relative to the sensor in a first position range must be sensed continuously. In this range, it is important to know the position of the magnet exactly in order to transmit a braking demand to the brake system that corresponds to the position of the pedal.

Beyond a certain position, which should correspond to full braking, the exact position of the magnet relative to the sensor is unimportant. Instead, it is necessary to ensure that the braking demand to the brake system is high enough. A constant value as an output signal of a device according to the invention is sufficient for this purpose, since full braking produces the maximum possible braking action and cannot be increased further.

In order to be able to ascertain the position of the pedal, the possibility exists that the magnet is connected to the pedal through an element or is mounted on pedal. In this way, a motion of the pedal is converted into a motion of the magnet.

Since the sensor does not necessarily have to be in the vicinity of the pedal, the magnet can be connected to the pedal through a connecting rod, for example, and mounted in the vicinity of the sensor.

Permanent magnets that produce a magnetic field are usually used as magnets. It is absolutely possible to use other types of magnets as well. The advantage of a permanent magnet resides in its comparatively economical implementation.

Provision can be made that the sensor detects at least two spatial components of the magnetic field. In addition, provision can be made that a gradient can be determined from each of the at least two spatial components of the magnetic field by means of the sensor and can be provided at the output as sensor signals.

It is readily possible that the spatial components of the magnetic field detected by the sensor are first provided at the output as sensor signals and the calculation of the gradients takes place in the processor.

The gradients of the magnetic field can be used for position determination. The possibility exists in this case that a position signal can be calculated from the sensor signals by the processor.

Because the gradients of the magnetic field have a periodicity, a position determination can take place only within a delimited range. It is necessary to ensure that the lack of unambiguity of the signal does not lead to erroneous determination of the position.

For this reason, the possibility exists that a signal strength can be calculated from the sensor signals by the processor. The signal strength is calculated from the gradients using the formula signal strength=$\sqrt{\Delta B_x^2 + \Delta B_z^2}$. $B_x$ and $B_z$ represent two spatial components of the magnetic field here.

The possibility likewise exists that a gradient can be determined by means of the sensor from each of the at least two spatial components of the magnetic field, and a position signal and/or a signal strength can be calculated from the gradients, wherein the position signal and/or the signal strength can be provided as sensor signals at the output and can be transmitted to the processor.

It is readily possible that the determination of the gradients is dispensed with, and the position signal and signal strength are calculated from the spatial components of the magnetic field. However, determining the gradients of the magnetic field first offers particular advantages for calculating the position signal and the signal strength, since the gradients are especially resistant to interfering fields with regard to external influences.

The signal strength is not used here for the actual position determination, but instead is used for threshold detection. The signal strength of the gradient signal is characterized by the fact that the value decreases monotonically in a range that is relevant for threshold detection. A previously specified threshold value that is tested for positive or negative exceedance is stored in the sensor or in the processor.

Provision can be made in this regard that the processor generates the output signal, wherein a constant value is output as the output signal in the case of a signal strength less than a first stored threshold value, and otherwise the position signal is output as the output signal.

It is likewise possible that a combination of the position signal and the signal strength is used in order to generate the output signal.

Provision can be made here that the processor generates the output signal in accordance with a distinction between cases, wherein a constant value is output as the output signal in the case of a position signal greater than a second stored threshold value or in the case of a signal strength less than a third stored threshold value, and otherwise the position signal is output as the output signal.

It is readily possible that the first threshold value does not differ from the third threshold value.

Owing to the combination of position signal and signal strength, it is possible to compensate for the lack of unambiguity of the magnetic field and to map a characteristic curve over the entire measurement range. No additional costs need be incurred for additional components and/or larger magnets.

Furthermore, it is possible to specify more than one threshold for the positive or negative exceedance of the position signal and/or the signal strength in order to define additional position ranges of the output signal in which the output signal can take on predetermined values or values dependent on the position signal or on another quantity.

It is readily possible that the sensor and the processor form a single component.

Provision can be made that a method for operating a device according to the invention has at least the following steps: the processor reads in at least one sensor signal at an input and outputs an output signal at its output, and the processor generates an output signal as a function of the at least one sensor signal, wherein the output signal takes on values that are unambiguously associated with a position of the magnet relative to the sensor in the first position range, and takes on a constant value that is independent of the position of the magnet relative to the sensor in the second position range.

In order to be able to read in the sensor signals at the input of the processor, provision can be made that a method for operating a device according to the invention additionally has the following steps: the sensor detects at least two spatial components of the magnetic field, and a gradient is determined from each of the at least two spatial components of the magnetic field by means of the sensor and is provided at the output as sensor signals.

In an additional step of the method, a position signal and/or a signal strength can be determined in the processor from the gradients of the spatial components of the magnetic field.

In this case a method can be provided in which the processor generates the output signal, wherein a constant value is output as the output signal in the case of a signal strength less than a first stored threshold value, and otherwise the position signal is output as the output signal.

It is likewise possible that a method is provided in which the processor generates the output signal in accordance with a distinction between cases, wherein a constant value is output as the output signal in the case of a position signal greater than a second stored threshold value or in the case of a signal strength less than a third stored threshold value, and otherwise the position signal is output as the output signal.

A vehicle is advantageously equipped with a device according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
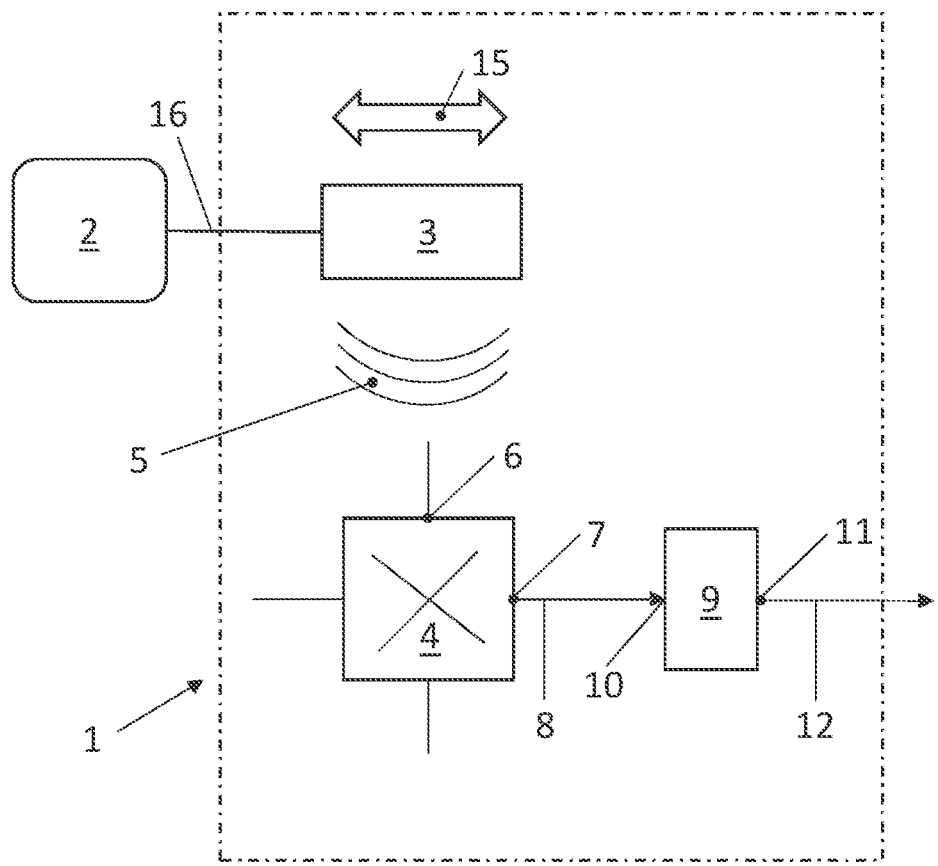
FIG. 1 shows a device according to the invention.

FIG. 1 shows a device 1 according to the invention for contactlessly determining a position of a pedal 2. Such devices 1 are preferably employed in brake systems of modern vehicles.

A magnet 3 is mounted through a connecting element 16, for example a connecting rod, on the pedal 2 for which a position determination is to be carried out. In this way, it is possible to convert a motion of the pedal into a motion 15 of the magnet 3.

It is likewise possible that the magnet 3 is mounted directly on the pedal 2. However, in most cases the sensor 4 will not be located in the immediate vicinity of the pedal 2, so a transmission of the motion of the pedal must take place in the vicinity of the sensor 4.

The magnet 3, for which a permanent magnet is preferably used, produces a magnetic field 5, which varies with the position of the magnet 3.

This magnetic field 5 is detected by the sensor 4 through suitable means 6 inside or on the sensor 4. For example, the sensor 4 can be a Hall sensor whose Hall-sensitive area 6 is suitable for detecting the magnetic field. Preferably, a sensor 4 is used that can detect at least two spatial components of the magnetic field 5 in at least two positions slightly displaced from one another. The gradients are determined from the spatial components of the at least two positions of the magnetic field 5. This preferably occurs in the sensor 4.

The sensor 4 has an output 7 for providing the sensor signal or signals 8 that is or are transmitted to a processor 9 through an input 10 for reading in the signal 8.

It is readily possible, however, that the detected spatial components of the magnetic field 5 are provided initially at the output 7 of the sensor 4 and the determination of the gradients takes place in the processor 9.

From the at least two gradients determined, a position signal is calculated from the angular information. This position signal is only unambiguous in a certain range, so that a position determination on the basis of the position signal alone is not unambiguously possible in a large measurement range. For this reason, a signal strength is additionally calculated from the gradients determined.

Through a suitable combination of these two signals, it is possible for an output signal 12 that is suitable for the braking demand to be provided at an output 11 of the processor 9.

Figure 1A:
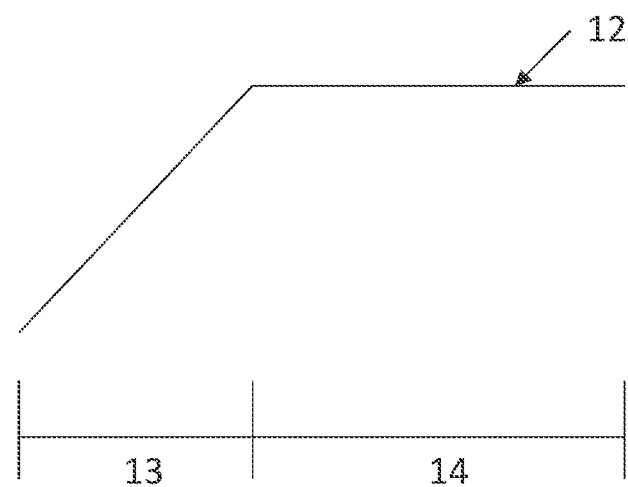
FIG. 1a shows an output signal.

FIG. 1*a* shows a preferred output signal 12. The output signal 12 has at least two position ranges 13, 14, wherein the output signal 12 increases monotonically in the first position range 13. On account of this monotonic slope, the output signal 12 takes on values that are unambiguously associated with a position of the magnet 3 relative to the sensor 4, and thus with a position of the pedal 2.

A differentiated braking force demand is not necessary in the second position range 14, which, for example, is the range of full braking. It is only necessary that full braking force is called for. For this reason, the output signal 12 takes on a constant value in the second position range 14.

Figure 2:
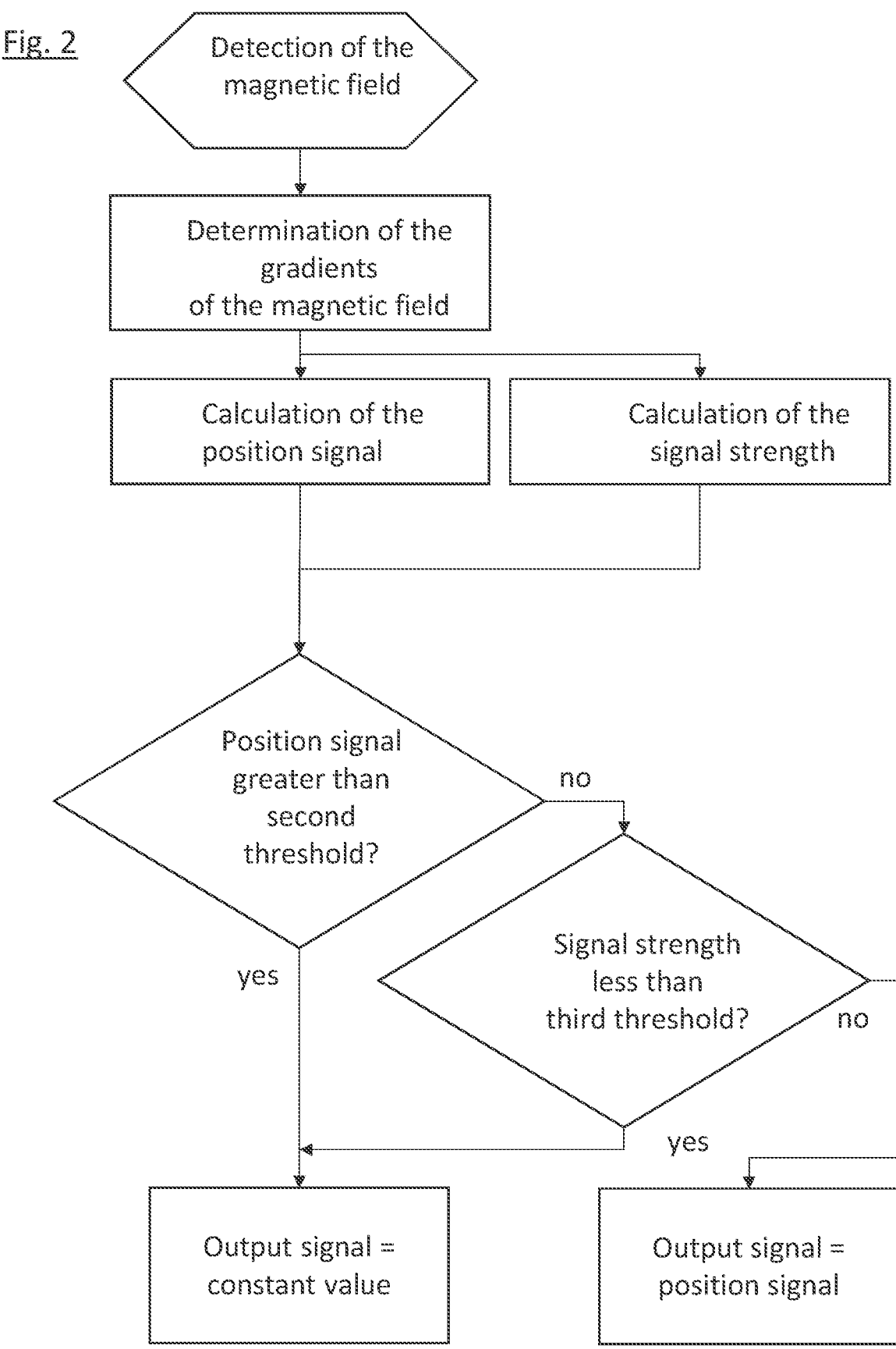
FIG. 2 shows a flowchart of a method according to the claims.
Figure 3A:
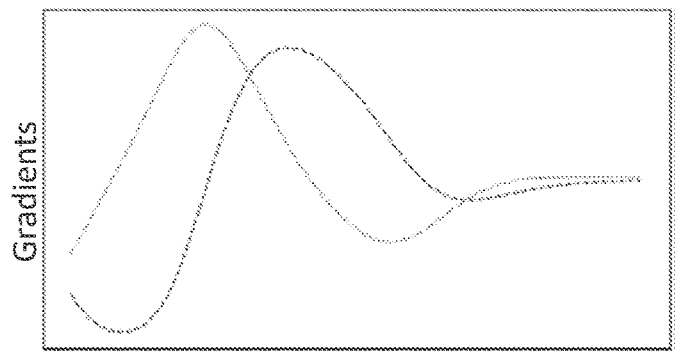
FIGS. 3a-3d show a signal curve of the system.
Figure 3B:
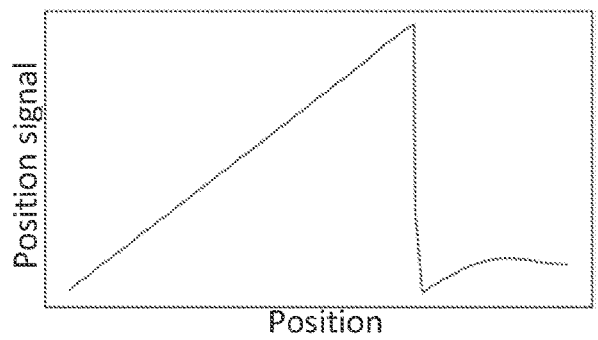
Figure 3C:
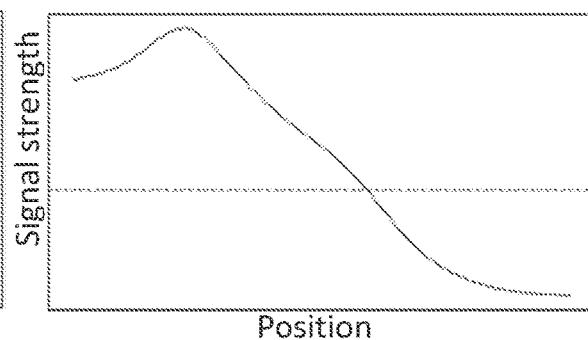
Figure 3D:
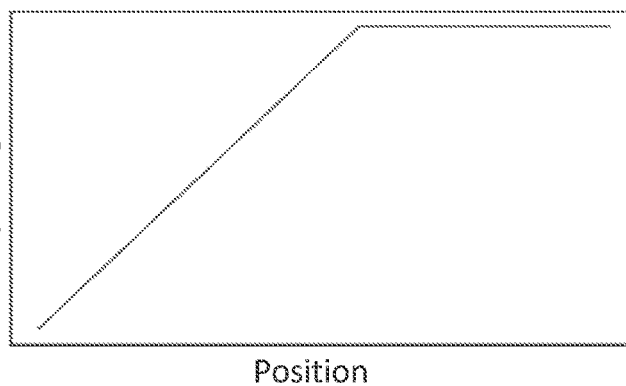

In FIG. 2, the method according to the claims is explained in detail on the basis of a flowchart.

As the first step, the magnetic field 5 of the magnet 3 is detected by a sensor 4. This occurs separately according to at least two spatial components. When the detection takes place in at least two positions slightly displaced from one another, a gradient can be determined from each of the detected spatial components of the magnetic field 5.

It is possible to calculate a position signal from the at least two detected gradients on the basis of an angular relationship. It is likewise possible to calculate a signal strength from the gradients.

The output signal 12 is generated in accordance with a distinction between cases.

It is first tested whether the position signal has taken on a value greater than a specified second threshold. If this is the case, the pedal 2 is in a position that corresponds to the second position range 14, for example in the case of full braking. The constant value is output as output signal 12.

If the position signal has taken on a value that is smaller than the second threshold, an additional query takes place.

It is tested whether the signal strength that was determined is below a third threshold. If this is the case, then the pedal 2 is in a position that corresponds to the second position range. The position signal, which was less than the second threshold, can then be attributed to the lack of unambiguity of the position signal, in particular in the second position range 14.

In this case, too, the constant value is output as output signal 12.

If, in contrast, the signal strength is above the third threshold, then the pedal 2 is in a position that corresponds to the first position range. A differentiated braking force demand is necessary, which is determined through an unambiguous position of the magnet 3 relative to the sensor 4.

For this reason, the position signal is output as output signal 12.

A possible signal curve of the system is shown in FIG. 3. Typical gradients that were determined from two spatial components of the magnetic field 5 are shown in part (a).

The position signal (b) and signal strength (c) are obtained on the basis of the gradients. The characteristic curve of the position signal initially shows a monotonically increasing curve, but then has a jump and yet another increase. This jump makes the characteristic curve ambiguous in the required measurement range.

Especially in the latter part of the characteristic curve, the signal strength exhibits a monotonically decreasing curve, which makes threshold detection possible.

From the combination of the position signal and the signal strength, it is possible in accordance with the distinction between cases described in FIG. 2 to generate the desired output signal 12 (part d). The first position range 13 with a monotonically increasing characteristic curve, on the basis of which an unambiguous position of the magnet 3 relative to the sensor 4 can be assigned, is visible, and a second position range 14 in which the output signal 12 takes on a constant value.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for contactlessly determining a position of a pedal in a vehicle, the device comprising:
    at least one magnet that is connected with the pedal;
    a sensor, the at least one magnet producing a magnetic field that varies with the position of the pedal and is detected by the sensor, the sensor having an output to provide at least one sensor signal; and
    a processor, having at least one input for reading in the at least one sensor signal and at least one output for outputting an output signal,
    wherein a first position range of the at least one magnet and a second position range of the at least one magnet are defined, the first position range and the second position range each including a range of different positions of the at least one magnet relative to the sensor that occur as the position of the pedal changes,
    wherein the processor generates the output signal from the at least one sensor signal, and
    wherein the value of the output signal is unambiguously associated with a position of the at least one magnet relative to the sensor when the position of the at least one magnet relative to the sensor is in the first position range, and the output signal has a constant value that is independent of the position of the at least one magnet relative to the sensor when the position of the at least one magnet relative to the sensor is in the second position range.

2. The device according to claim 1, wherein the at least one magnet is connected to the pedal through an element or is mounted on the pedal.

3. The device according to claim 1, wherein the sensor detects at least two spatial components of the magnetic field.

4. The device according to claim 3, wherein a gradient is determined from each of the at least two spatial components of the magnetic field by the sensor and is included in the at least one sensor signal provided by the output of the sensor signal.

5. The device according to claim 4, wherein the processor calculates a position signal and/or a signal strength from the at least one sensor signal received from the sensor.

6. The device according to claim 3, wherein a gradient is determined by the sensor from each of the at least two spatial components of the magnetic field, and a position signal and/or a signal strength is calculated from the gradient, and wherein the position signal and/or the signal strength are included in the at least one sensor signal provided by the output of the sensor and transmitted to the processor.

7. The device according to claim 6, wherein when the signal strength is less than a first stored threshold value, indicating that the position of the at least one magnet relative to the sensor is in the second position range, the constant value is output as the output signal, and otherwise the position signal is output as the output signal.

8. The device according to claim 6, wherein the constant value is output as the output signal when the position signal is greater than a second stored threshold value, indicating that the position of the at least one magnet relative to the sensor is in the second position range or when the signal strength is less than a third stored threshold value, indicating that the position of the at least one magnet relative to the sensor is in the second position range, and otherwise the position signal is output as the output signal.

9. The device according to claim 1, wherein the sensor and the processor form a single component.

10. A method for operating a device according to claim 1, the method comprising:
reading in, by the processor, the at least one sensor signal at the at least one input and outputting the output signal at the at least one output; and
generating, by the processor, the output signal as a function of the at least one sensor signal,
wherein the value of the output signal is either unambiguously associated with the position of the at least one magnet relative to the sensor when the position of the at least one magnet relative to the sensor is in the first position range or is the constant value that is independent of the position of the at least one magnet relative to the sensor when the position of the at least one magnet relative to the sensor is in the second position range.

11. The method for operating a device according to claim 10, wherein the sensor detects at least two spatial components of the magnetic field, and wherein a gradient is determined from each of the at least two spatial components of the magnetic field by the sensor and is included in the at least one sensor signal provided by the output of the sensor.

12. The method for operating a device according to claim 10, wherein a position signal is calculated from the at least one sensor signal.

13. The method for operating a device according to claim 12, wherein a signal strength is calculated from the at least one sensor signal.

14. The method for operating a device according to claim 13, wherein the processor generates the output signal, wherein when the signal strength is less than a first stored threshold value, indicating that the position of the at least one magnet relative to the sensor is in the second position range, the constant value is output as the output signal, and otherwise the position signal is output as the output signal.

15. The method for operating a device according to claim 13, wherein the processor generates the output signal, wherein the constant value is output as the output signal when the position signal is greater than a second stored threshold value, indicating that the position of the at least one magnet relative to the sensor is in the second position range or when the signal strength is less than a third stored threshold value, indicating that the position of the at least one magnet relative to the sensor is in the second position range, and otherwise the position signal is output as the output signal.

16. A vehicle comprising:
a pedal; and
the device according to claim 1.

17. The device according to claim 1, wherein the sensor detects at least two spatial components of the magnetic field,
wherein a gradient is determined by the sensor from each of the at least two spatial components of the magnetic field, and a position signal and/or a signal strength is calculated from the gradient, and wherein the position signal and/or the signal strength are included in the at least one sensor signal provided by the output of the sensor and transmitted to the processor, and
wherein:
when the signal strength is less than a first stored threshold value, indicating that the position of the at least one magnet relative to the sensor is in the second position range, the constant value is output as the output signal, and otherwise the position signal is output as the output signal, or
the constant value is output as the output signal when the position signal is greater than a second stored threshold value, indicating that the position of the at least one magnet relative to the sensor is in the second position range or when the signal strength is less than a third stored threshold value, indicating that the position of the at least one magnet relative to the sensor is in the second position range, and otherwise the position signal is output as the output signal.

18. The method according to claim 10, further comprising:
detecting, by the sensor, at least two spatial components of the magnetic field;
determining, by the sensor a gradient from each of the at least two spatial components of the magnetic field; and
calculating, by the sensor, a position signal and/or a signal strength from the gradient, the position signal and/or the signal strength being included in the at least one sensor signal provided by the output of the sensor and transmitted to the processor, and
wherein:
when the signal strength is less than a first stored threshold value, indicating that the position of the at least one magnet relative to the sensor is in the second position range, the constant value is output as the output signal, and otherwise the position signal is output as the output signal, or
the constant value is output as the output signal when the position signal is greater than a second stored threshold value, indicating that the position of the at least one magnet relative to the sensor is in the second position range or when the signal strength is less than a third stored threshold value, indicating that the position of the at least one magnet relative to the sensor is in the second position range, and otherwise the position signal is output as the output signal.

* * * * *